United States Patent
Sotome (10) Patent No.: US 12,300,800 B2
(45) Date of Patent: May 13, 2025

(54) METHOD FOR PRODUCING NEGATIVE ELECTRODE

(71) Applicant: Prime Planet Energy & Solutions, Inc., Tokyo (JP)

(72) Inventor: Kazuhiro Sotome, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 43 days.

(21) Appl. No.: 18/302,788

(22) Filed: Apr. 19, 2023

(65) Prior Publication Data

US 2023/0343920 A1    Oct. 26, 2023

(30) Foreign Application Priority Data

Apr. 20, 2022  (JP) ................... 2022-069305

(51) Int. Cl.
*H01M 4/04* (2006.01)
*H01M 4/1393* (2010.01)

(52) U.S. Cl.
CPC ....... *H01M 4/0404* (2013.01); *H01M 4/1393* (2013.01)

(58) Field of Classification Search
CPC .... H01M 4/0404; H01M 4/1393; H01M 4/13; H01M 4/133; H01M 4/587; H01M 4/62; H01M 4/621; H01M 4/622; H01M 10/0525; H01M 4/139; Y02E 60/10
See application file for complete search history.

(56) References Cited

U.S. PATENT DOCUMENTS

| | | | |
|---|---|---|---|
| 2010/0273052 A1 | 10/2010 | Sakitani et al. | |
| 2015/0333323 A1 | 11/2015 | Umeyama et al. | |
| 2019/0288289 A1 | 9/2019 | Fukuda et al. | |
| 2019/0367699 A1 | 12/2019 | Minakuchi et al. | |

FOREIGN PATENT DOCUMENTS

| | | | |
|---|---|---|---|
| JP | 2011-210666 A | | 10/2011 |
| JP | 2015-220121 A | | 12/2015 |
| JP | 2016152153 A | * | 8/2016 |
| JP | 2019-206667 A | | 12/2019 |
| JP | WO2019/004216 A1 | | 4/2020 |

(Continued)

OTHER PUBLICATIONS

Machine translation of JP-2016152513-A (Year: 2016).*

*Primary Examiner* — Michael G Miller
(74) *Attorney, Agent, or Firm* — HAUPTMAN HAM, LLP (57) ABSTRACT

Provided is a new method for producing a negative electrode, which is capable of enhancing compressibility of a negative electrode active material layer. A method for producing a negative electrode disclosed herein includes: applying slurry including a negative electrode active material, a first binder, a second binder, water, and dimethyl sulfoxide, onto a negative electrode current collector; and drying the applied slurry to form a negative electrode active material layer. The first binder is at least one of carboxymethyl cellulose and a metal salt of carboxymethyl cellulose. The second binder is at least one of styrene-butadiene rubber and a derivative of styrene-butadiene rubber. An amount of the dimethyl sulfoxide is 2.5 mass % or more and 10.0 mass % or less with respect to the negative electrode active material.

5 Claims, 4 Drawing Sheets

(56) References Cited

FOREIGN PATENT DOCUMENTS

| WO | 2009/087731 A1 | 7/2009 |
| WO | 2014/083950 A1 | 6/2014 |
| WO | 2018/097316 A1 | 5/2018 |
| WO | 2019/021620 A1 | 1/2019 |
| WO | 2021/140899 A1 | 7/2021 |

* cited by examiner

METHOD FOR PRODUCING NEGATIVE ELECTRODE

TECHNICAL FIELD

The present disclosure relates to a method for producing a negative electrode. This application claims the benefit of priority to Japanese Patent Application No. 2022-069305 filed on Apr. 20, 2022. The entire contents of this application are hereby incorporated herein by reference.

BACKGROUND

In recent years, secondary batteries such as lithium ion secondary batteries are suitably used for, for example, portable power supplies for devices such as personal computers and portable terminals, and power supplies for driving vehicles such as battery electric vehicles (BEVs), hybrid electric vehicles (HEVs), and plug-in hybrid electric vehicles (PHEVs). Negative electrodes of secondary batteries, especially negative electrodes of lithium ion secondary batteries, typically have structures in which a negative electrode active material layer including a negative electrode active material and a binder is supported by a negative electrode current collector.

With widespread use of secondary batteries, the secondary batteries have been required to have further enhanced performance. A known method for enhancing performance of secondary batteries is to increase the density of a negative electrode active material layer (see, for example, Patent Document 1). Patent Document 1 describes that compressibility of an electrode active material layer is enhanced by using a special binder composition.

CITATION LIST

Patent Reference

Patent Document 1: WO2019/004216

SUMMARY OF THE INVENTION

Methods for forming an electrode active material layer include a method employing solvent-based slurry using an organic solvent and a method employing aqueous slurry using water. From the viewpoint of reduction of environmental load, the method employing aqueous slurry is suitably used for forming a negative electrode active material layer. On the other hand, a special binder composition described in Patent Document 1 is not suitable for the method employing aqueous slurry. Thus, there has been a demand for developing a new technique for enhancing compressibility of a negative electrode active material layer.

It is therefore an object of the present disclosure to provide a new method for producing a negative electrode, which is capable of enhancing compressibility of a negative electrode active material layer.

A method for producing a negative electrode disclosed herein (1) includes: applying slurry including a negative electrode active material, a first binder, a second binder, water, and dimethyl sulfoxide, onto a negative electrode current collector; and drying the applied slurry to form a negative electrode active material layer. The first binder is at least one of carboxymethyl cellulose and a metal salt of carboxymethyl cellulose. The second binder is at least one of styrene-butadiene rubber and a derivative of styrene-butadiene rubber. An amount of the dimethyl sulfoxide is 2.5 mass % or more and 10.0 mass % or less with respect to the negative electrode active material. This configuration provides a new method for producing a negative electrode, which is capable of enhancing compressibility of a negative electrode active material layer.

A method for producing a negative electrode disclosed herein (2) is a production method based on the production method (1) in which the amount of the dimethyl sulfoxide is 5.0 mass % or more and 10.0 mass % or less with respect to the negative electrode active material.

A method for producing a negative electrode disclosed herein (3) is a production method based on the production method (1) or (2) in which the amount of the dimethyl sulfoxide is 350 mass % or more and 1400 mass % or less with respect to the first binder.

A method for producing a negative electrode disclosed herein (4) is a production method based on any one of the production methods (1) to (3) and further includes pressing the negative electrode active material layer.

A method for producing a negative electrode disclosed herein (5) is a production method based on any one of the production methods (1) through (4) in which the negative electrode active material is graphite, and the negative electrode is a negative electrode of a lithium ion secondary battery.

DETAILED DESCRIPTION OF THE PREFERRED EMBODIMENTS

An embodiment of the present disclosure will be described hereinafter with reference to the drawings. Matters not specifically mentioned herein but required for carrying out the present disclosure can be understood as matters of design of a person skilled in the art based on related art in the field. The present disclosure can be carried out on the basis of the contents disclosed in the description and common general knowledge in the field. In the drawings, members and parts having the same functions are denoted by the same reference characters for description. Dimensional relationships (e.g., length, width, and thickness) in the drawings do not reflect actual dimensional relationships.

A "secondary battery" herein refers to a power storage device capable of being repeatedly charged and discharged, and includes a so-called storage battery and a power storage element such as an electric double layer capacitor. A "lithium ion secondary battery" herein refers to a secondary battery that uses lithium ions as charge carriers and performs charge and discharge by movement of charges accompanying lithium ions between positive and negative electrodes.

A method for producing a negative electrode according to this embodiment includes: applying slurry including a negative electrode active material, a first binder, a second binder, water, and dimethyl sulfoxide (hereinafter referred to as "negative electrode mixture slurry") onto a negative electrode current collector (hereinafter referred to as an "application step"); and drying the applied slurry to form a negative electrode active material layer (hereinafter referred to as a "drying step"). The first binder is at least one of carboxymethyl cellulose and a metal salt of carboxymethyl cellulose. The second binder is at least one of styrene-butadiene rubber and a derivative of styrene-butadiene rubber. The amount of dimethyl sulfoxide is 2.5 mass % or more and 10.0 mass % or less with respect to the negative electrode active material.

Figure 1:
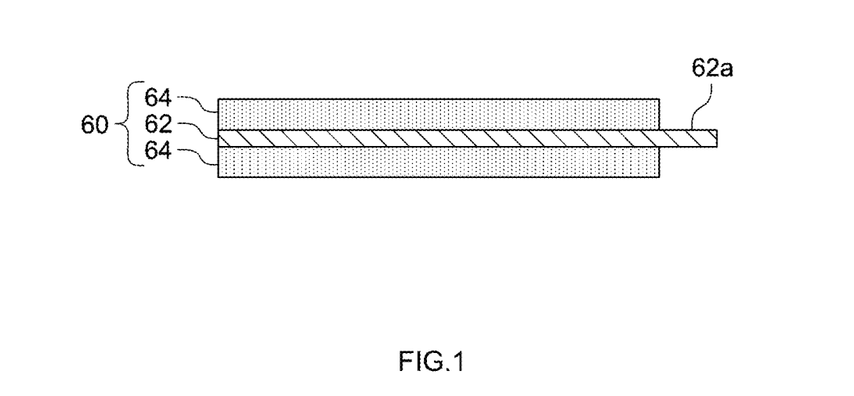
FIG. 1 is a cross-sectional view schematically illustrating a negative electrode obtained by a production method according to one embodiment of the present disclosure.

FIG. 1 schematically illustrates an example of a negative electrode obtained by a production method according to this embodiment. FIG. 1 is a cross-sectional view along a width direction and a thickness direction of the negative electrode. A negative electrode 60 illustrated in FIG. 1 is a negative electrode of a lithium ion secondary battery.

The negative electrode 60 illustrated in FIG. 1 includes a negative electrode current collector 62 and a negative electrode active material layer 64 supported by the negative electrode current collector 62. In other words, the negative electrode 60 includes the negative electrode current collector 62 and the negative electrode active material layer 64 provided on the negative electrode current collector 62. The negative electrode active material layer 64 may be provided only on one surface of the negative electrode current collector 62 or may be provided on both surfaces of the negative electrode current collector 62 as shown in the illustrated example. The negative electrode active material layer 64 is desirably provided on both surfaces of the negative electrode current collector 62.

In the illustrated example, at one end of the negative electrode 60 in the width direction, a negative electrode active material layer non-formed portion 62a in which no negative electrode active material layer 64 is formed is provided. In the negative electrode active material layer non-formed portion 62a, the negative electrode current collector 62 is exposed so that the negative electrode active material layer non-formed portion 62a can function as a current collector portion. However, the configuration for collecting electricity from the negative electrode 60 is not limited to this example.

Steps of the method for producing a negative electrode according to this embodiment will be described. Negative electrode mixture slurry used in the application step includes a negative electrode active material, a first binder, a second binder, water, and dimethyl sulfoxide, as essential components.

As the negative electrode active material, a known negative electrode active material for use in lithium ion secondary batteries can be used. Examples of the negative electrode active material include: carbon-based negative electrode active materials such as graphite, hard carbon, and soft carbon; Si-based negative electrode active materials such as Si, silicon oxide, silicon carbide, and silicon nitride; and Sn-based negative electrode active materials such as tin, tin oxide, tin nitride, and tin-containing alloys. Among these materials, graphite is desirable. Graphite may be natural graphite or artificial graphite, or may be amorphous carbon-coated graphite in which graphite is coated with an amorphous carbon material.

The average particle size (median particle size: D50) of the negative electrode active material is not specifically limited, and is, for example, 0.1 μm or more and 50 μm or less, desirably 1 μm or more and 25 μm or less, and more desirably 5 μm or more and 20 μm or less. It should be noted that the average particle size (D50) of the negative electrode active material can be determined by, for example, a laser diffraction and scattering method.

The amount of the negative electrode active material with respect to the total solid content included in the negative electrode mixture slurry is not specifically limited, and is, for example, 70 mass % or more, desirably 80 mass % or more, and more desirably 85 mass % or more and 99 mass % or less.

The first binder is at least one (hereinafter referred to as "CMC") of carboxymethyl cellulose and a metal salt of carboxymethyl cellulose. Desired examples of the metal salt include alkali metal salts (e.g., lithium salt, sodium salt, and potassium salt). CMC as the first binder also functions as a thickener.

The amount of the first binder with respect to the total solid content included in the negative electrode mixture slurry is not specifically limited, and is, for example, 0.3 mass % or more and 3 mass % or less, and desirably 0.4 mass % or more and 2 mass % or less.

The second binder is at least one of styrene-butadiene rubber (SBR) and a derivative of SBR. It should be noted that the SBR derivative refers to a compound in which a portion of the SBR structure is converted to another chemical structure. Specific examples thereof include a copolymer in which a monomer unit other than a styrene unit and a butadiene rubber unit is introduced to a main chain at a content of less than 50 mole % (desirably 20 mole % or less and more desirably 10 mole % or less) with respect to the total monomer unit. Examples of the other monomer units include a (meth)acrylate unit, a (meth)acrylic acid unit, a maleic acid unit, and an acrylonitrile unit. Desired examples of the SBR derivative include carboxy-modified SBR (especially acrylic acid-modified SBR).

The second binder may be used for preparing negative electrode mixture slurry in the form of, for example, latex in which fine particles of SBR and/or a derivative thereof are dispersed in water.

The amount of the second binder with respect to the total solid content included in the negative electrode mixture slurry is not specifically limited, and is, for example, 0.1 mass % or more and 8 mass % or less, and is desirably 0.5 mass % or more and 3 mass % or less.

The negative electrode mixture slurry includes water as a solvent (dispersion medium), and therefore, the negative electrode mixture slurry used in the application step is aqueous slurry. The first binder is dissolved in water, whereas the negative electrode active material and the second binder are dispersed in water. Examples of water include deionized water, ultrafiltered water, reverse osmosis water, and distilled water.

Water may be used in an amount with which a solid content concentration described later of the negative electrode mixture slurry is obtained.

The negative electrode mixture slurry includes dimethyl sulfoxide (DMSO). DMSO functions as a solvent (dispersion medium) in the slurry. DMSO is used in an amount of 2.5 mass % or more and 10.0 mass % or less with respect to the negative electrode active material. Since the negative electrode active material layer 64 is allowed to have especially high compressibility, the amount of DMSO with respect to the negative electrode active material is desirably 5.0 mass % or more and 10.0 mass % or less.

The amount of DMSO with respect to the first binder is desirably 350 mass % or more and 1400 mass % or less.

The negative electrode mixture slurry may only include the negative electrode active material, the first binder, the second binder, water, and dimethyl sulfoxide. Alternatively, the negative electrode mixture slurry may include other components (e.g., a conductive agent, a solid electrolyte, and/or a water-soluble organic solvent having a lower boiling point than water) as long as advantages of the present disclosure are not significantly impaired.

The solid content concentration of the negative electrode mixture slurry is not specifically limited, and is, for example, 40 mass % or more and 80 mass % or less, and is desirably 45 mass % or more and 60 mass % or less. In the case where the solid content concentration is within the range described above, drying efficiency of the negative electrode mixture slurry is especially high. In this case, handling of the negative electrode mixture slurry is easy, and thus, application is performed uniformly so that a negative electrode active material layer having a uniform thickness can be easily formed.

The negative electrode mixture slurry can be prepared by mixing the negative electrode active material, the first binder, the second binder, water, DMSO, and an optional component by a known method. It should be noted that the "slurry" herein refers to a mixture in which a solid content is partially or entirely dispersed in a solvent, and includes so-called "paste," "ink," and the like.

In regard to the negative electrode current collector 62 to which the negative electrode mixture slurry is applied, in the example illustrated in FIG. 1, the shape of the negative electrode current collector 62 is foil (or sheet), but the shape of the negative electrode current collector 62 used in the application step is not limited to these shapes. The negative electrode current collector 62 may have a shape such as a rod, a plate, or a mesh. A material for the negative electrode current collector 62 can be a conductive metal (e.g., copper, nickel, titanium, or stainless steel) in a manner the same as or similar to a conventional lithium ion secondary battery, and among these materials, copper is desirable. As the negative electrode current collector 62, copper foil is especially desirable.

Dimensions of the negative electrode current collector 62 are not specifically limited, and may be appropriately determined depending on battery design. In the case of using copper foil as the negative electrode current collector 62, the thickness thereof is not specifically limited, and is, for example, 5 µm or more and 35 µm or less, and is desirably 6 µm or more and 20 µm or less.

Application of the negative electrode mixture slurry to the negative electrode current collector 62 can be performed by a known method. For example, the application can be performed by applying negative electrode mixture slurry onto a negative electrode current collector by using coating apparatus such as a gravure coater, a comma coater, a slit coater, or a die coater. In the case of forming the negative electrode active material layer 64 on both surfaces of the negative electrode current collector 62 as in the illustrated example, the negative electrode mixture slurry is applied onto both surfaces of the negative electrode current collector 62. In the case of forming the negative electrode active material layer 64 only on one surface of the negative electrode current collector 62, the negative electrode mixture slurry is applied only onto one surface of the negative electrode current collector 62. Through this application, a coating of the negative electrode mixture slurry is formed on the negative electrode current collector 62.

As described in the example of FIG. 1, in the case of providing the negative electrode active material layer non-formed portion 62a, the negative electrode mixture slurry is applied along one end portion of the negative electrode current collector 62, whereas application is performed so as not to apply the negative electrode mixture slurry onto the other end portion opposed to the end portion on which the negative electrode mixture slurry is applied.

After the application step, the drying step is performed. In the drying step, the applied negative electrode mixture slurry is dried. This drying can be performed according to a known method.

For example, the drying step can be performed in such a manner that the solvent is removed with a dryer such as a drying furnace from the negative electrode current collector 62 onto which the negative electrode mixture slurry has been applied. The drying temperature and the drying time are appropriately determined depending on the solid content of the negative electrode mixture slurry, and are not specifically limited. The drying temperature is, for example, 50° C. or more and 200° C. or less, and is desirably 60° C. or more and 150° C. or less. The drying time is, for example, 10 seconds or more and 30 minutes or less, and is desirably 30 seconds or more and 10 minutes or less.

Through the drying, the negative electrode active material layer 64 is formed on the negative electrode current collector 62, and thereby a negative electrode 60 can be obtained.

The negative electrode active material layer 64 of the thus-obtained negative electrode 60 shows high compressibility. That is, in the case of performing pressing under the same conditions as those in a conventional methods, the negative electrode active material layer 64 has a higher density than those obtained by the conventional methods. Thus, the thus-obtained negative electrode 60 enables higher density of the negative electrode active material layer 64.

This is supposed to be because of the following reasons. In this embodiment, a predetermined amount of DMSO is used for a solvent (dispersion medium) of the slurry. DMSO has a boiling point of 189° C., which is significantly higher than that of water. Thus, in drying the applied slurry, water is removed with priority, and more DMSO remains than water in a later stage of drying. In a final stage of drying, the first binder, the second binder, and DMSO remain around the negative electrode active material particles, and finally, DMSO is vaporized and removed. In a case where the amount of use of DMSO is within a predetermined range with respect to negative electrode active material particles, DMSO remaining around the negative electrode active material particles in the final stage of drying makes distribution and form (e.g., the spreading state of the binders on the surface of the negative electrode active material particles) of the first binder and the second binder in the negative electrode active material layer 64 different from those in a conventional technique, and these distribution and form enhance compressibility of the negative electrode active material layer 64.

Thus, it is advantageous to perform the step of pressing the resulting negative electrode active material layer 64 (hereinafter referred to as a "pressing step") after the drying step. The pressing step enables production of the negative electrode 60 including the negative electrode active material layer 64 having high density. This pressing step can be performed according to a known method. Pressing conditions are appropriately determined depending on, for example, a desired thickness, a desired weight per unit area, and a desired density of the negative electrode active material layer 64.

The thickness of the negative electrode active material layer 64 per one surface after the pressing step is not specifically limited, and is usually 20 μm or more and is desirably 50 μm or more. On the other hand, the thickness is usually 300 μm or less and is desirably 200 μm or less.

The negative electrode 60 including the high-density negative electrode active material layer 64 can provide a secondary battery having high energy density and large capacity.

Thus, a secondary battery including the negative electrode 60 obtained by the production method according to this embodiment will now be described with reference to FIGS. 2 and 3, using a lithium ion secondary battery as an example.

Figure 2:
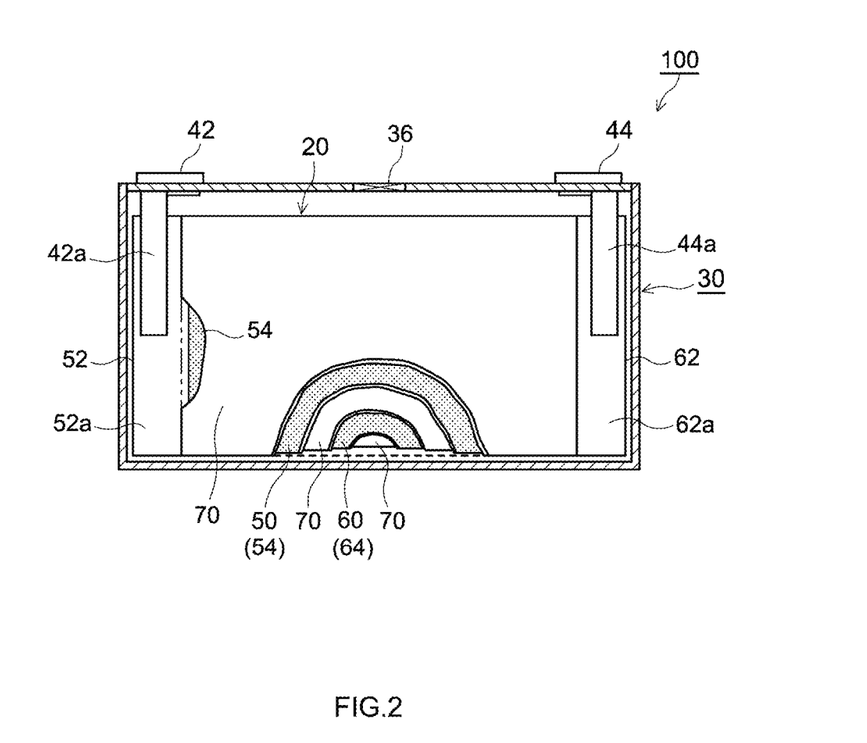
FIG. 2 is a cross-sectional view schematically illustrating an internal structure of a lithium ion secondary battery using a negative electrode obtained by a production method according to one embodiment of the present disclosure.

A lithium ion secondary battery 100 illustrated in FIG. 2 is a sealed lithium ion secondary battery 100 in which a flat wound electrode body 20 and a nonaqueous electrolyte (not shown) are housed in a flat square battery case (i.e., outer container) 30. The battery case 30 includes a positive electrode terminal 42 and a negative electrode terminal 44 for external connection, and a thin safety valve 36 configured such that when the internal pressure of the battery case 30 increases to a predetermined level or more, the safety valve 36 releases the internal pressure. The battery case 30 has an injection port (not shown) for injecting a nonaqueous electrolyte. The positive electrode terminal 42 is electrically connected to a positive electrode current collector plate 42a. The negative electrode terminal 44 is electrically connected to a negative electrode current collector plate 44a. A material for the battery case 30 is, for example, a metal material that is lightweight and has high thermal conductivity, such as aluminium.

Figure 3:
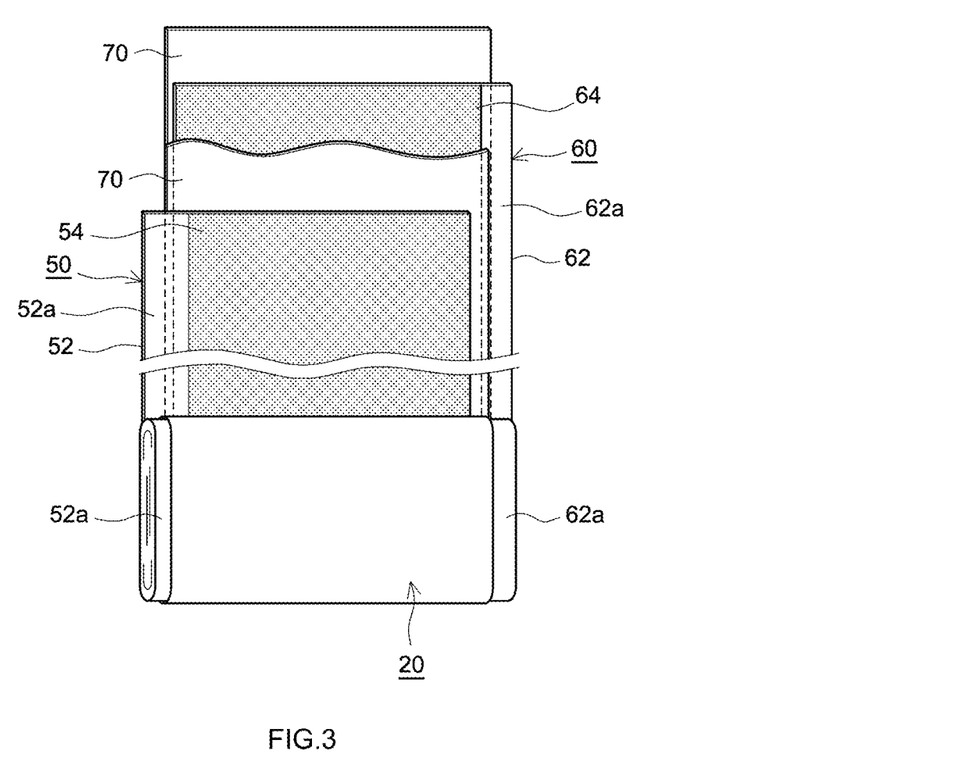
FIG. 3 is a schematic disassembled view illustrating a structure of a wound electrode body of the lithium ion secondary battery of FIG. 2.

As illustrated in FIGS. 2 and 3, in the wound electrode body 20, a positive electrode sheet 50 and a negative electrode sheet 60 are stacked with two long separator sheets 70 interposed therebetween and wound in the longitudinal direction. In the positive electrode sheet 50, a positive electrode active material layer 54 is formed on one or each (each in this example) surface of a long positive electrode current collector 52 along the longitudinal direction. In the negative electrode sheet 60, a negative electrode active material layer 64 is formed on one or each (each in this example) surface of a long negative electrode current collector 62 along the longitudinal direction. A positive electrode active material layer non-formed portion 52a (i.e., a portion where no positive electrode active material layer 54 is formed and the positive electrode current collector 52 is exposed) and a negative electrode active material layer non-formed portion 62a (i.e., a portion where no negative electrode active material layer 64 is formed and the negative electrode current collector 62 is exposed) extend off outward from both ends of the wound electrode body 20 in the winding axis direction (i.e., sheet width direction orthogonal to the longitudinal direction). A positive electrode current collector plate 42a and a negative electrode current collector plate 44a are respectively joined to the positive electrode active material layer non-formed portion 52a and the negative electrode active material layer non-formed portion 62a.

Examples of the positive electrode current collector 52 constituting the positive electrode sheet 50 include aluminium foil. The positive electrode active material layer 54 includes a positive electrode active material. Examples of the positive electrode active material include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$). As the positive electrode active material, a lithium transition metal phosphoric acid compound (e.g., $LiFePO_4$) can be used.

The positive electrode active material layer 54 can include a component other than the positive electrode active material, such as lithium phosphate, a conductive agent, and a binder. Desired examples of the conductive material include carbon black such as acetylene black (AB) and other carbon materials (e.g., graphite). Examples of the binder include polyvinylidene fluoride (PVDF). The contents of these materials may be known contents in a positive electrode active material layer of a positive electrode used in a lithium ion secondary battery.

As the negative electrode sheet 60, the negative electrode 60 obtained by the production method according to this embodiment is employed. In this configuration example, the negative electrode active material layer 64 is formed on each surface of the negative electrode current collector 62.

Examples of the separator 70 include a porous sheet (film) of a resin such as polyethylene (PE), polypropylene (PP), polyester, cellulose, and polyamide. The porous sheet may have a single-layer structure or a laminated structure of two or more layers (e.g., three-layer structure in which PP layers are stacked on both surfaces of a PE layer). A heat-resistance layer (HRL) may be provided on a surface of the separator 70.

A nonaqueous electrolyte typically includes a nonaqueous solvent and a supporting electrolyte. As the nonaqueous solvent, various organic solvents such as carbonates, ethers, esters, nitriles, sulfones, and lactones for use in an electrolyte of a typical lithium ion secondary battery can be used without any particular limitation. Among these, carbonates are desirable, and specific examples of the carbonates include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). Such nonaqueous solvents may be used alone or two or more of them may be used in combination.

Desired example of the supporting electrolyte include lithium salts such as $LiPF_6$, $LiBF_4$, and $LiClO_4$ (desirably $LiPF_6$). The concentration of the supporting electrolyte is desirable 0.7 mol/L or more and 1.3 mol/L or less.

The nonaqueous electrolyte may include components not described above, for example, various additives exemplified by: a film forming agent such as vinylene carbonate (VC) and an oxalato complex; a gas generating agent such as biphenyl (BP) or cyclohexylbenzene (CHB); and a thickener, as long as the effects of the present disclosure are not significantly impaired.

The lithium ion secondary battery 100 is applicable to various applications. Desired examples of application include driving power supplies to be mounted on vehicles such as electric vehicles (BEVs), hybrid electric vehicles (HEVs), and plug-in hybrid electric vehicles (PHEVs). The lithium ion secondary battery 100 can also be used as a storage battery for, for example, a small-size power storage device. The lithium ion secondary battery 100 can also be used in a form of a battery pack in which a plurality of batteries are typically connected in series and/or in parallel.

The foregoing description is directed to the square lithium ion secondary battery 100 including the flat wound electrode body 20 as an example. Alternatively, the lithium ion secondary battery can also be configured as a lithium ion secondary battery including a stacked-type electrode body (i.e., electrode body in which a plurality of positive electrodes and a plurality of negative electrodes are alternately stacked). The lithium ion secondary battery may be configured as a cylindrical lithium ion secondary battery, a laminate-cased lithium ion secondary battery, or other types of batteries. The lithium ion secondary battery may also be configured as an all-solid-state lithium ion secondary battery using a solid electrolyte instead of a nonaqueous electrolyte according to a known method.

The negative electrode 60 obtained by the production method according to this embodiment is suitable for a negative electrode of a lithium ion secondary battery, but can be used as a negative electrode of another secondary battery, which can be configured according to a known method.

Examples of the present disclosure will now be described, but are not intended to limit the present disclosure to these examples.

<Production of Negative Electrode>

Example 1: Water+Dimethyl Sulfoxide

Artificial graphite as a negative electrode active material, CMC as a first binder, water, and dimethyl sulfoxide (DMSO) were added to an another secondary battery to have a predetermined solid content concentration. These materials were mixed by agitation for a predetermined time. Water was further added for dilution to a predetermined solid content concentration and the resulting mixture was stirred. Thereafter, SBR as a second binder was added thereto and the resulting mixture was stirred for a predetermined time, thereby obtaining negative electrode mixture slurry. A mass ratio of artificial graphite (Gr), CMC, and SBR was Gr/CMC/SBR=97.8/0.7/1.5. In Example 1, three types of negative electrode mixture slurry in which the amounts of DMSO to a negative electrode active material were 2.5 mass %, 5.0 mass %, and 10.0 mass %, respectively, were prepared, where the total amount of water and DMSO was the same in the three types of negative electrode mixture slurry (i.e., in the case of increasing the DMSO amount, the water amount is reduced accordingly).

The negative electrode mixture slurry was applied onto copper foil as a negative electrode current collector by using a compact automatic film applicator. The amount of application at this time was 140 mg/10 cm$^2$ in terms of an active material layer. The applied negative electrode mixture slurry was dried at 70° C. for 10 minutes to form a negative electrode active material layer. In this manner, a negative electrode of Example 1 was obtained.

Comparative Example 1: Water+Dimethyl Carbonate

A negative electrode was produced in the same manner as Example 1 except for using dimethyl carbonate (DMC) instead of DMSO.

Comparative Example 2: Water+Ethanol

A negative electrode was produced in the same manner as Example 1 except for using ethanol (EtOH) instead of DMSO.

Comparative Example 3: Only Water

A negative electrode was produced in the same manner as Example 1 except for using only water in the same amount as the total amount of water and DMSO. Thus, Comparative Example 3 is an example in which DMSO, DMC, and EtOH were 0 mass % in each of Example 1 and Comparative Examples 1 and 2.

[Compressibility Evaluation]

The negative electrodes of Example 1 and Comparative Examples 1 through 3 were subjected to roll pressing with a roll presser under a linear pressure (i.e., compressive load) of 8.2 kN/cm, 13.1 kN/cm, 16.3 kN/cm, 21.2 kN/cm, or 24.5 kN/cm. The thicknesses of the negative electrodes after pressing were measured with a micrometer. The weights of the negative electrodes after pressing were measured with an electronic balance. From these results, electrode plate densities were calculated. The results were shown in the graphs of FIGS. 4 through 6.

Figure 4:
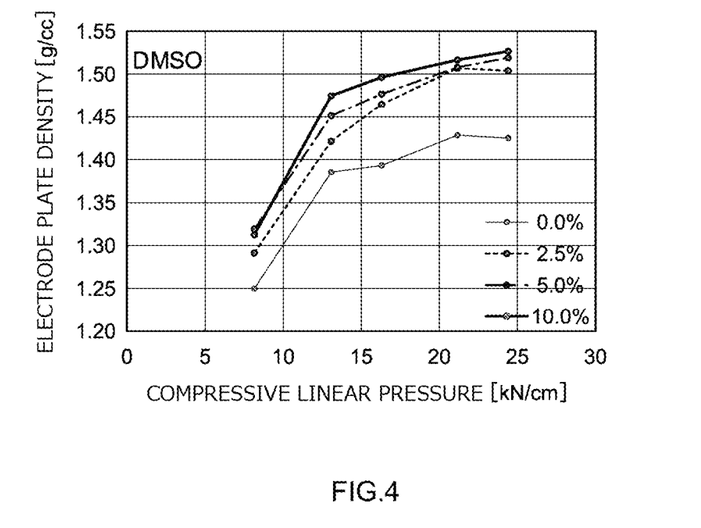
FIG. 4 is a graph showing an evaluation result of compressibility of Example 1 using dimethyl sulfoxide.
Figure 5:
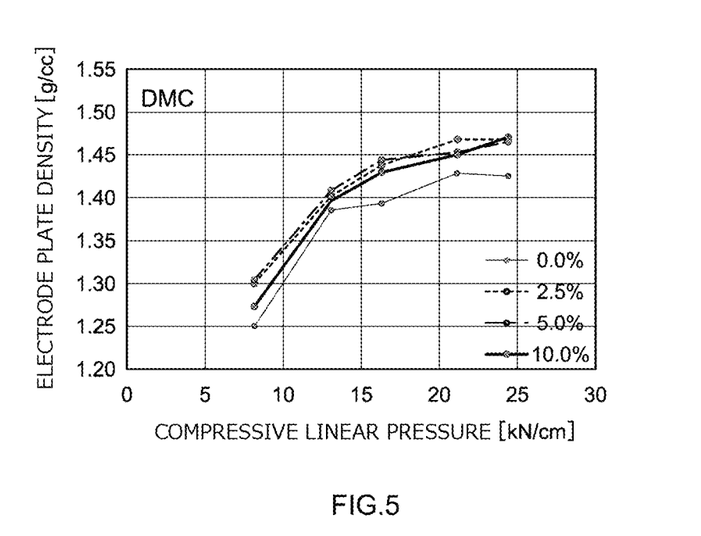
FIG. 5 is a graph showing an evaluation result of Comparative Example 1 using dimethyl carbonate.
Figure 6:
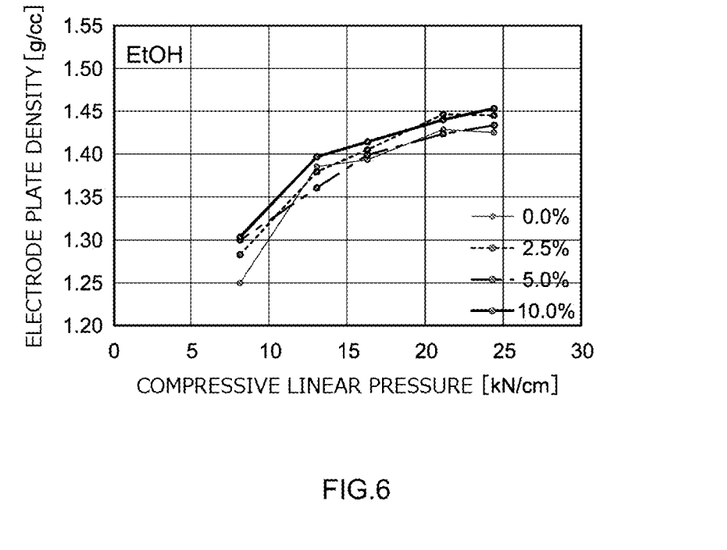
FIG. 6 is a graph showing an evaluation result of compressibility of Comparative Example 2 using ethanol.

FIGS. 4, 5, and 6 show results of Example 1, Comparative Example 1, and Comparative Example 2, respectively. For easy comparison, the result of Comparative Example 3 (i.e., example in which DMSO, DMC, and EtOH were 0 mass %) are incorporated in FIGS. 4 through 6 showing results of Example 1 and Comparative Examples 1 and 2. As shown in the results of FIGS. 4 through 6, in Example 1 in which the negative electrode mixture slurry included a predetermined amount of DMSO, the negative electrode active material layer was compressed to a higher density than those of Comparative Examples 1 through 3.

The foregoing results show that the method for producing a negative electrode disclosed herein enables enhancement of compressibility of a negative electrode active material layer.

Specific examples of the present disclosure have been described in detail hereinbefore, but are merely illustrative examples, and are not intended to limit the scope of claims. The techniques described in claims include various modifications and changes of the above exemplified specific examples.

What is claimed is:

1. A method for producing a negative electrode, the method comprising:
    applying slurry including a negative electrode active material, a first binder, a second binder, water, and dimethyl sulfoxide, onto a negative electrode current collector;
    drying the applied slurry to form a negative electrode active material layer; and
    pressing the negative electrode active material layer with a compressive linear pressure of 20 kN/cm or more to obtain an electrode plate density of 1.51 g/cm$^3$ or more, wherein
    the negative electrode active material is graphite,
    the first binder is at least one of carboxymethyl cellulose and a metal salt of carboxymethyl cellulose,
    the second binder is at least one of styrene-butadiene rubber and a derivative of styrene-butadiene rubber,
    an amount of the dimethyl sulfoxide is 2.5 mass % or more and 10.0 mass % or less with respect to the negative electrode active material, and
    a thickness of the negative electrode active material layer obtained by the pressing is 20 μm or more and 200 μm or less.

2. The method according to claim 1, wherein
    the amount of the dimethyl sulfoxide is 5.0 mass % or more and 10.0 mass % or less with respect to the negative electrode active material.

3. The method according to claim 1, wherein
    the amount of the dimethyl sulfoxide is 350 mass % or more and 1400 mass % or less with respect to the first binder.

4. The method according to claim 1, wherein
the negative electrode is a negative electrode of a lithium ion secondary battery.

5. The method according to claim 1, wherein
the negative electrode current collector has a first surface and a second surface opposite to the first surface,
the negative electrode active material layer is on the first surface of the negative electrode current collector,
a further negative electrode active material layer is on the second surface of the negative electrode current collector, and
each of the negative electrode active material layer and the further negative electrode active material layer is pressed to have the thickness of 20 μm or more and 200 μm or less.

* * * * *